United States Patent
Barker et al.

(10) Patent No.: US 7,914,175 B2
(45) Date of Patent: Mar. 29, 2011

(54) ENCLOSURE FOR A LASER SCANNER FOR USE IN A SAWMILL

(75) Inventors: Earl M. Barker, Enumclaw, WA (US); Kevin J. Barker, Enumclaw, WA (US)

(73) Assignee: EB Associates, Enumclaw, WA (US)

( * ) Notice: Subject to any disclaimer, the term of this patent is extended or adjusted under 35 U.S.C. 154(b) by 962 days.

(21) Appl. No.: 11/740,013

(22) Filed: Apr. 25, 2007

(65) Prior Publication Data

US 2008/0029511 A1 Feb. 7, 2008

Related U.S. Application Data

(63) Continuation-in-part of application No. 11/498,428, filed on Aug. 2, 2006.

(51) Int. Cl.
*G02B 27/20* (2006.01)
*F21V 33/00* (2006.01)
*F21W 131/402* (2006.01)

(52) U.S. Cl. ............ 362/259; 362/91; 83/98; 83/522.19

(58) Field of Classification Search .................. 382/141, 382/152, 110; 362/91, 259; 83/365, 520, 83/521, 98, 99, 522.16–522.25
See application file for complete search history.

(56) References Cited

U.S. PATENT DOCUMENTS

| | | | | |
|---|---|---|---|---|
| 6,990,751 B2 * | 1/2006 | Riley et al. | | 34/506 |
| 7,267,039 B2 * | 9/2007 | Liao et al. | | 83/520 |
| 2006/0207977 A1 * | 9/2006 | Hermann et al. | | 219/121.69 |
| 2007/0263918 A1 * | 11/2007 | Jenya | | 382/141 |

* cited by examiner

*Primary Examiner* — Jong-Suk (James) Lee
*Assistant Examiner* — Stanley Weinberg
(74) *Attorney, Agent, or Firm* — Jensen & Puntigam, P.S.

(57) ABSTRACT

The enclosure assembly includes an enclosure body which is adapted to accommodate a laser scanner therein for use in a sawmill environment. The enclosure body includes a lid portion which is hinged to permit access to the interior of the enclosure for convenient removal and cleaning of the laser scanner. A front end assembly extends from a forward end of the enclosure body and includes an air knife member mounted therein which in operation produces an air curtain which extends from the air knife towards the workpiece, tending to maintain the debris away from the laser.

9 Claims, 9 Drawing Sheets

ENCLOSURE FOR A LASER SCANNER FOR USE IN A SAWMILL

PRIOR APPLICATION

This is a continuation-in-part application of U.S. Patent Application Ser. No. 11/498,428 filed Aug. 2, 2006.

TECHNICAL FIELD

This invention relates generally to the use of lasers in a sawmill environment for making lumber workpiece measurements, and more specifically concerns protection for the laser in such an environment to keep it free of debris and prevent physical damage thereto.

BACKGROUND OF THE INVENTION

Presently, laser technology is used to measure lumber workpieces in a sawmill operation, including incoming logs as well as lumber pieces produced during the sawing process. These laser measurements are very accurate, which helps in the making of appropriate sawing decisions to produce maximum yield from the incoming logs.

To produce these desired results, however, the lasers must be accurately positioned and aimed, must be regularly calibrated and must remain free from interfering debris, dust, etc. It is well known that a sawmill is an extremely harsh and dirty environment, and includes a risk of physical damage to the mill equipment, including the lasers, during the operation of the sawmill. The lasers must be mounted in a way that enables them to take the required dimensional measurements, but also such that they are convenient to aim and to calibrate when necessary. Typically, the sawmill operator will purchase lasers and then use the sawmills' own enclosures for protection, but usually it remains difficult and inconvenient to obtaining and properly install the enclosures, as well as aiming the lasers within the enclosures and maintaining the lasers free of debris with such arrangements.

SUMMARY OF THE INVENTION

Accordingly, the present invention is an enclosure for a laser scanner unit used in a sawmill environment, comprising: an enclosure body, adapted to accommodate the mounting of a laser scanner unit therein for making measurements of a workpiece in the sawmill; an assembly for mounting the enclosure body to obtain a desired orientation and aiming of the laser scanner relative to the workpiece, wherein the enclosure assembly is physically adjustable by the mounting assembly; and a movable door comprising one part of the enclosure body, permitting access to the interior of the enclosure body when it is in an open position and including openings for the laser beam and a camera in the laser scanner unit.

BEST MODE FOR CARRYING OUT THE INVENTION

Figure 1:
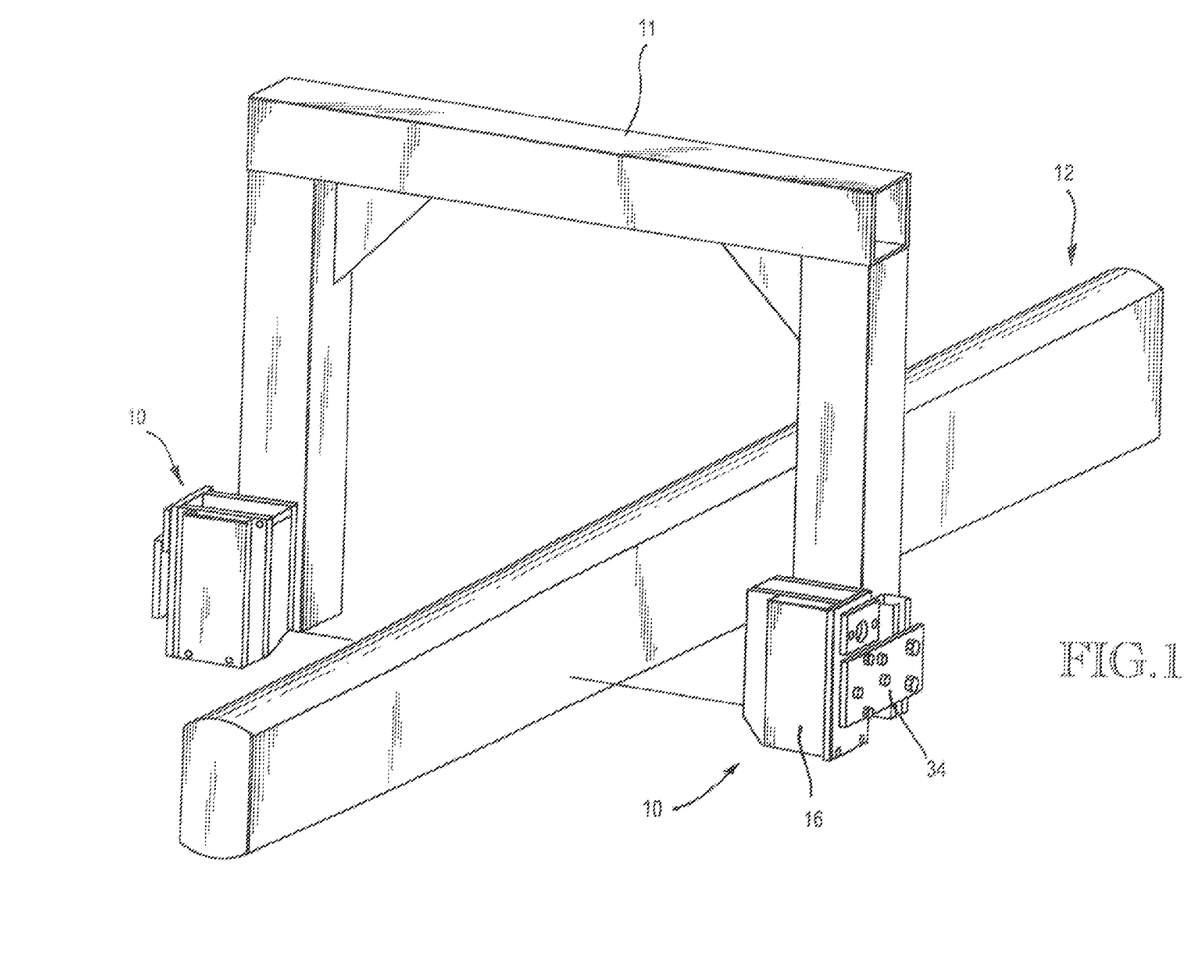
FIG. 1 is an environmental view showing a laser system and enclosures thereof, such as described herein, in a typical sawmill environment.

Referring to FIG. 1, a laser enclosure assembly 10 is shown in a sawmill environment to illustrate generally the function and advantages of an enclosure assembly. Typically, there will be two laser enclosure assemblies for each measurement installation in the sawmill. Each enclosure assembly contains a laser scanner combination for measurement of a selected dimension of a workpiece in the sawmill. The workpiece could includes an incoming log or a lumber piece which has been sawn or partially sawn from a log. The workpiece shown generally at 12 typically rides on a conveyor or is drawn by a chain as it moves within the sawmill. Two opposing enclosure assemblies 10-10 are positioned on a mounting assembly 11. It should be understood that FIG. 1 shows a simple sawmill environment for illustration of one sawing operation and is not intended to be a representation of a complete sawmill environment.

Each enclosure assembly 10 will include, as indicated above, a conventional laser which will do the actual measurement and a camera 18, in a sealed unit 16, referred to as a "laser scanner". The laser and the camera are precisely lined up with each other inside the sealed unit and then calibrated at the factory to produce the desired measurement accuracy. Various well-known laser scanners can be used in the present system and are available commercially. One example is a single point Hermary LRS-50 laser scanner. Other suitable laser scanners are commercially available.

The laser enclosure assembly described herein is typically mounted to a mounting assembly 11 or similar arrangement in the sawmill. This is accomplished by a mounting plate 34, which is discussed in more detail below.

Figure 2:
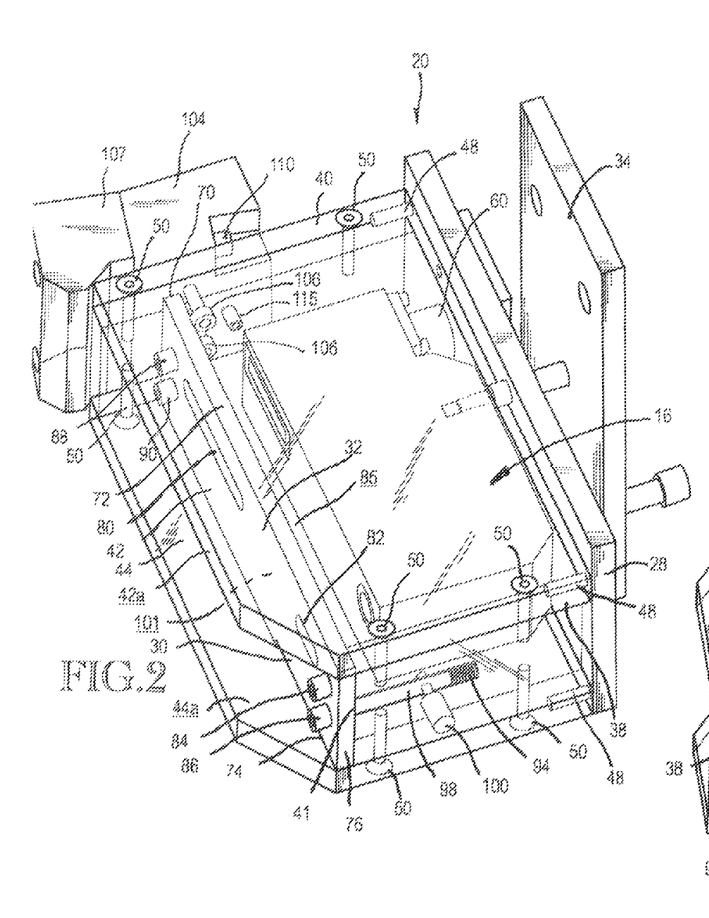
FIG. 2 is a first perspective view of a sawmill laser enclosure assembly.
Figure 3:
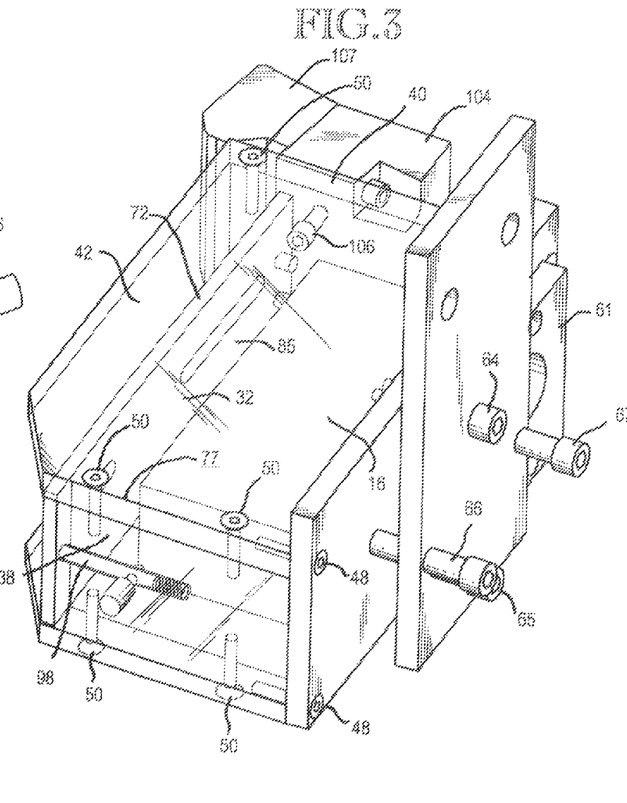
FIG. 3 is another perspective view of the laser enclosure assembly.
Figure 6:
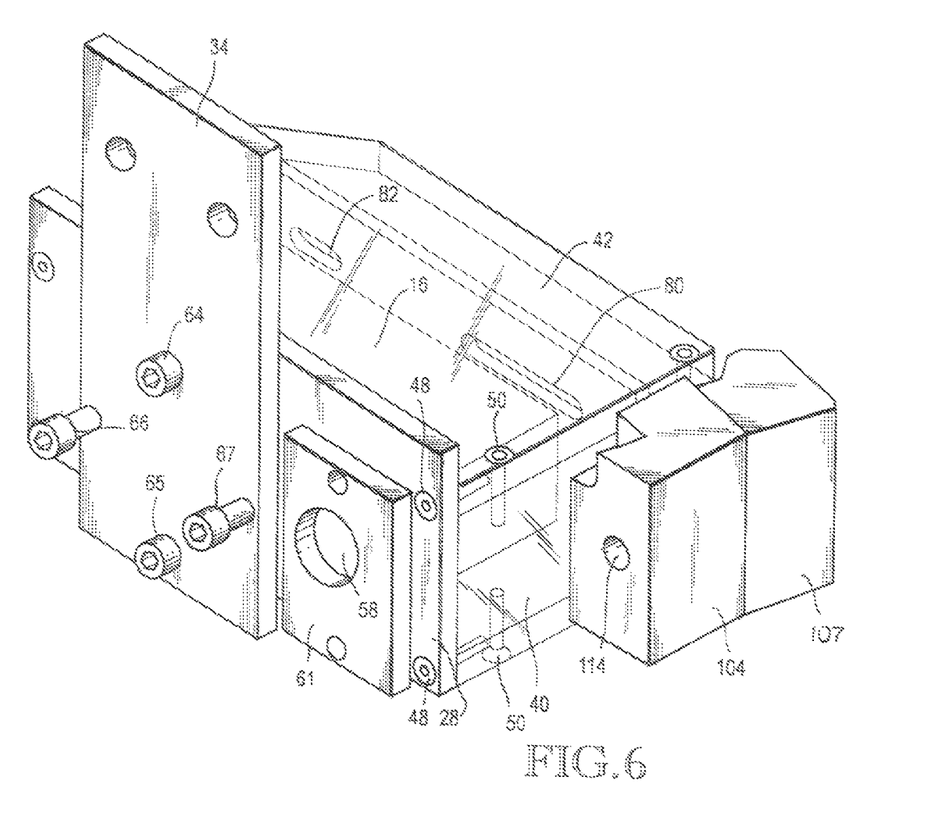
FIG. 6 is another perspective view of the laser enclosure assembly.

Referring now to FIGS. 2-6, and particularly to FIGS. 2, 3 and 6, a laser scanner enclosure assembly 20 generally comprises a number of panel/plate member held together by countersunk machine screws. A rear plate 28 and a front plate/door 32 are made from aluminum, approximately ¼-inch thick. Two side plates 38 and 40, as well as the top and bottom plates 42 and 44 are, in the embodiment, shown made from a polycarbonate plastic, approximately ½-inch thick. The various plates comprising the enclosure 10, i.e. the top and bottom plates, the front/door plate, the rear plate and the two side plates, form a very strong, stable enclosure, with the transparent polycarbonate plates permitting a view into the interior of the enclosure without dismantling the enclosure.

The rear plate 28 is secured to the top and bottom plates 42 and 44 by four screws 48-48 which are located approximately at the lower corners of the rear plates and a short distance down from the upper corners of the rear plate, since the rear plate extends approximately ¾ inch above the top plate. The bottom and top plates 42 and 44 are in turn each connected to the two opposing side plates 38 and 40, respectively, by four screws 50-50. The screws extend through the top and bottom plates into the longitudinal edges of the side plates.

The rear plate and the two side plates are approximately rectangular, with the rear plate in the embodiment shown being approximately 4 by 8 inches. Both side plates are approximately 2¼ inches high, with side plate 38 being approximately 3¾ inches long, while the other side plate 40 is somewhat longer, approximately 5 inches long.

The top and bottom plates 42 and 44 are substantially identical in configuration, approximately rectangular, with one corner edge portion 54 of both the top and bottom plates 42, 44 adjacent side plate 38 being angled.

Laser scanner 16 in the embodiment show is approximately 5¾ inches long by 3 inches deep by 1¾ inches high. As indicated above, a Hermary LRS-50 laser scanner or similar laser scanner is used. The laser scanner is mounted to the rear plate 28 by two screws, cap screws in the embodiment shown, or other fastener members. Power and data connections are made to the laser scanner assembly 16 through an opening 58 in rear plate 28 through a connector member 60 at the rear of the laser scanner. The cable (not shown) leading to the laser scanner from the source of electric power and to the system computer is protected by a small connector plate 61, which surrounds opening 58 to the enclosure and is secured to rear plate 28 by screws or the like.

The mounting plate 34 is fixedly connected to a mounting member/assembly in the sawmill by means of bolts or similar members. Mounting plate 34 is connected to the enclosure assembly 10 by means of four cap screws 64-67. Two vertically aligned cap screws 64 and 65 extend into rear plate 28 and, when turned, pull the enclosure assembly toward the mounting plate. Horizontally aligned cap screws 66 and 67 bear against the rear surface 29 of rear plate 28 and tend to push the rear end of the enclosure assembly away from the mounting plate. This arrangement, in which two cap screws push on the enclosure assembly and two pull, provide an aiming adjustment capability necessary for the laser scanner 16 to line up with an opposing laser scanner. An important consideration with the present structure is that aiming of the laser scanner 16 is accomplished by moving the entire enclosure assembly 10, with the laser scanner 16 therein, instead of the laser scanner by itself, as is the case generally with sawmill laser scanner systems.

The front plate/door 32 is mounted to the enclosure assembly 10 is such a way that it is conveniently partially removable from the enclosure assembly, permitting access to the interior of the enclosure assembly. Front plate/door 32 is in the embodiment shown a rectangular aluminum plate, approximately 7½ inches long and 2½ inches high. One side edge 70 fits into a shallow mating slot in side plate 40, while the top and bottom edges 72 and 74 fit into shallow mating slots in the lower surface 42a of top plate 42 and the upper surface 44a of bottom plate 44, respectively. The other side edge 76 extends to adjacent front end edge 41 of side plate 38, permitting the front plate/door to be slid sideways away from side wall 40, opening up the interior of the enclosure.

Figure 4:
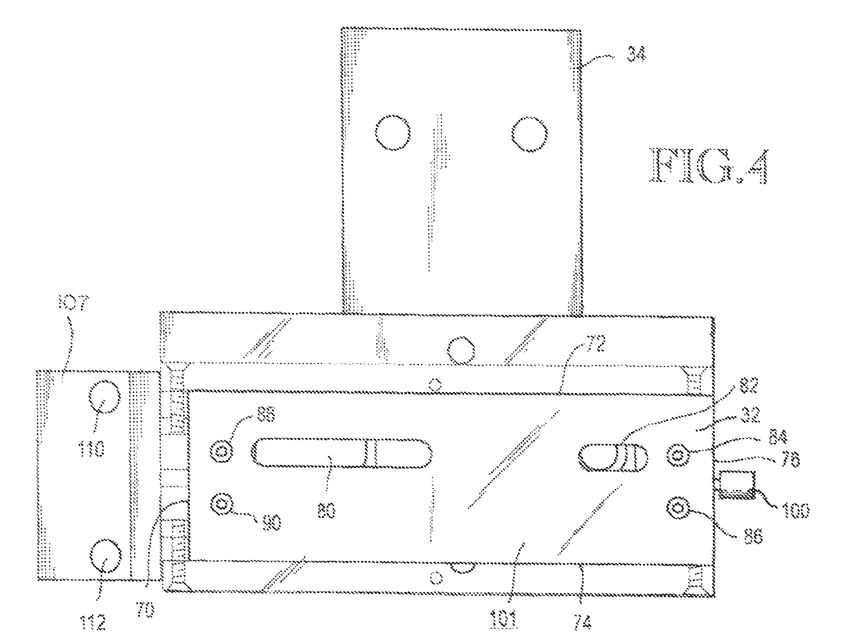
FIG. 4 is a front elevational view of the laser enclosure assembly.
Figure 5:
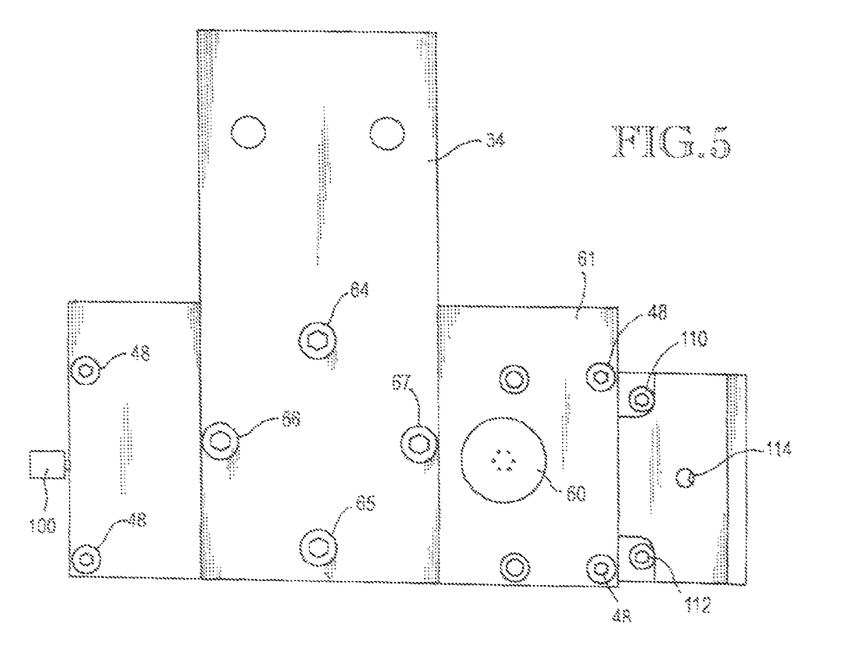
FIG. 5 is a rear elevational view of the laser enclosure assembly.

Front plate 32 has two openings 80 and 82 therethrough which are in registry with the laser beam and the camera lens in the laser scanner. The actual shapes of the openings can vary and in fact can be quite small, sufficient to accommodate the laser beam and the camera lens view, while minimizing physical access to the interior of the enclosure to minimize entry of debris, etc.

A first set of two cap screws 84 and 86 are positioned near side edge 76 of the front plate. These cap screws do not extend beyond the inner surface 85 of the front plate, and function as a handle by which the user can move and slide the plate away from side wall 40.

A second set of cap screws 88 and 90 are positioned adjacent side edge 70 of front plate/door 32. These cap screws extend past the inner surface 85 of the front plate/door 32 and act as a stop for the front plate when they come into abutting contact with the inner surface 77 of side wall 38 of the enclosure assembly. In this position, the front plate 32 is at its extreme open position, permitting maximum access to the interior of the enclosure assembly.

A spring/pin arrangement maintains the front panel 32 in a locked position when it is closed. An internal slot 94 in side plate 38 extends to the end of the side plate adjacent front plate 32, and is registry with a shallow opening (not shown) in the front panel. Within slot 94 is a spring 96 and a pin 98 which is connected to the spring and extends in the direction of the front panel from the end of the spring 76. Extending outwardly from pin 98, through side plate 38 is a latch knob 100. In use, when the front panel/door is to be opened, latch knob 100 is moved toward the rear of the enclosure assembly, away from front panel 32, against the action of spring 96 until pin 98 comes free from the front panel/door 32. The door may then be opened by acting on cap screws 84 and 86, sliding door 32 out from its closed position to a desired open position. When the door is returned to its closed position, the pin 48 snaps back into place in the front panel, locking the front panel.

In especially dirty environments, air is blown into the enclosure assembly and outside of the front plate 32, such as along the outer surface 101. This is accomplished in the embodiment shown by a two-part assembly comprising an aluminum block 104, which is attached to side plate 40 from the inside of the enclosure assembly by two cap screws 106, and a commercially available air device. One such device is known as an air knife, available from Exair, shown at 107. The air knife 107 is attached to aluminum block 104 by two screws 110 and 112. Compressed air is provided to the aluminum block and then into the air knife using an O-ring (not shown) from a standard conventional source thereof through channel 114. Channel 114 also connects to a small opening 115 which extends into the interior of the enclosure assembly. Air knife 107 includes a thin opening 120 which extends for approximately the height of front plate 32, through which air is moved.

In operation, the compressed air directed into the interior of the enclosure assembly, through opening 115 provides a positive pressure to the interior of the enclosure assembly, resulting in air flow out from the enclosure assembly through the openings 80, 82 in the front plate/door 32. Air also proceeds from the thin opening 120 in the air knife 107, as discussed above, producing a thin curtain of air along the outer surface of front plate 32. This arrangement maintains the front plate 32 and the enclosure free of dust and debris, so that the laser and the camera can both operate properly and accurately.

Hence, an enclosure assembly has been described which provides a convenient and reliable way of installing and aiming a laser scanner for use in sawmills. The laser scanner is mounted inside the enclosure assembly and this arrangement maintains the laser scanner unit free from debris and dust, so that accurate measurements may be made and provided to the system computer for computation and analysis and to provide appropriate sawing instruction to produce a desired lumber yield.

Figure 7:
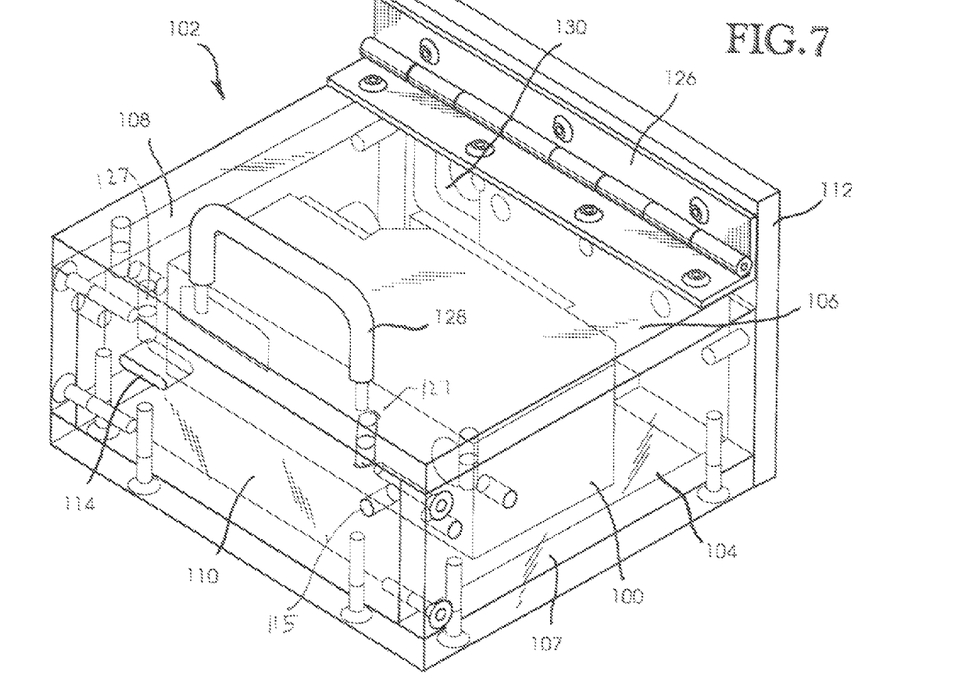
FIG. 7 is a perspective view of another embodiment of the enclosure assembly.

FIG. 7 is a perspective view of an alternative enclosure assembly embodiment for a laser scanner 100. The enclosure assembly 102 includes a bottom plate 104, a top plate 106, two elongated side plates 107 and 108, a front plate 110 and a rear plate 112. The names of the various plates comprising the enclosure refer to the position of the plates as shown in the drawings. It should be understood that the enclosure can be in various positions. For instance, the enclosure assembly could be oriented such that the front plate 110 is in a top position.

The enclosure assembly 102 is large enough to easily accommodate a laser scanner, such as the Hermary LS-50 referred to above. The front plate 110, approximately 6½ inches long and 2¾ inches high, includes a small opening 115 through which the laser beam from the laser scanner shines, and a small slot 114 through which the camera images the laser spot produced by the beam. The mounting structure for the laser scanner 100 within the enclosure assembly 102 is described in more detail below. Rear plate 112 is approximately 4½ inched high and 7 inches long and is secured to a system mounting plate 116 (FIG. 12), which in turn is secured to a mounting assembly 120. A matching enclosure assembly with a laser scanner can be positioned on the mounting assembly 120 a spaced distance away from enclosure assembly 102, as shown for instance in the arrangement of FIG. 1, relative to an object, such as a lumber board which passes between them. In another arrangement using the system described herein, the laser can be aimed at a saw blade and used to monitor deflection of the saw blade during operation.

Connecting mounting plate 116 to rear plate 112 are four cap screws. These are arranged to provide a push-pull function similar to that for the embodiment described above, so as to aim the enclosure and hence the laser positioned within in a desired direction. A first set of two opposing cap screws 124 pull the rear plate 112 and hence the entire enclosure assembly 102 toward the mounting plate 116, while a second set of two opposing cap screws 126 (one obscured), positioned orthogonally to the first set of cap screws, push the enclosure assembly away from the mounting plate. This combination action provides the desired aiming capability for the enclosure assembly relative to the board being measured.

The top plate or lid 106 is approximately 6 inches long by 6 inches wide and is connected to rear plate 112 by a hinge 126, which extends for the entire width of the lid 106 and the back plate. The bottom plate 104 is the same size as the top plate 106. The lid can be lifted up by a handle 128, which is located near the front edge of the lid, about hinge 126, exposing the laser scanner 100 therein. The lid 106 is held in a closed position by at least two pairs of opposing magnets 127 recessed into lid 106 and front plate 110. The side plates 107 and 108 are each approximately 6 inches long and 2¾ inches high. The various plates comprise a polycarbonate plastic and are held together by screws.

Figure 9:
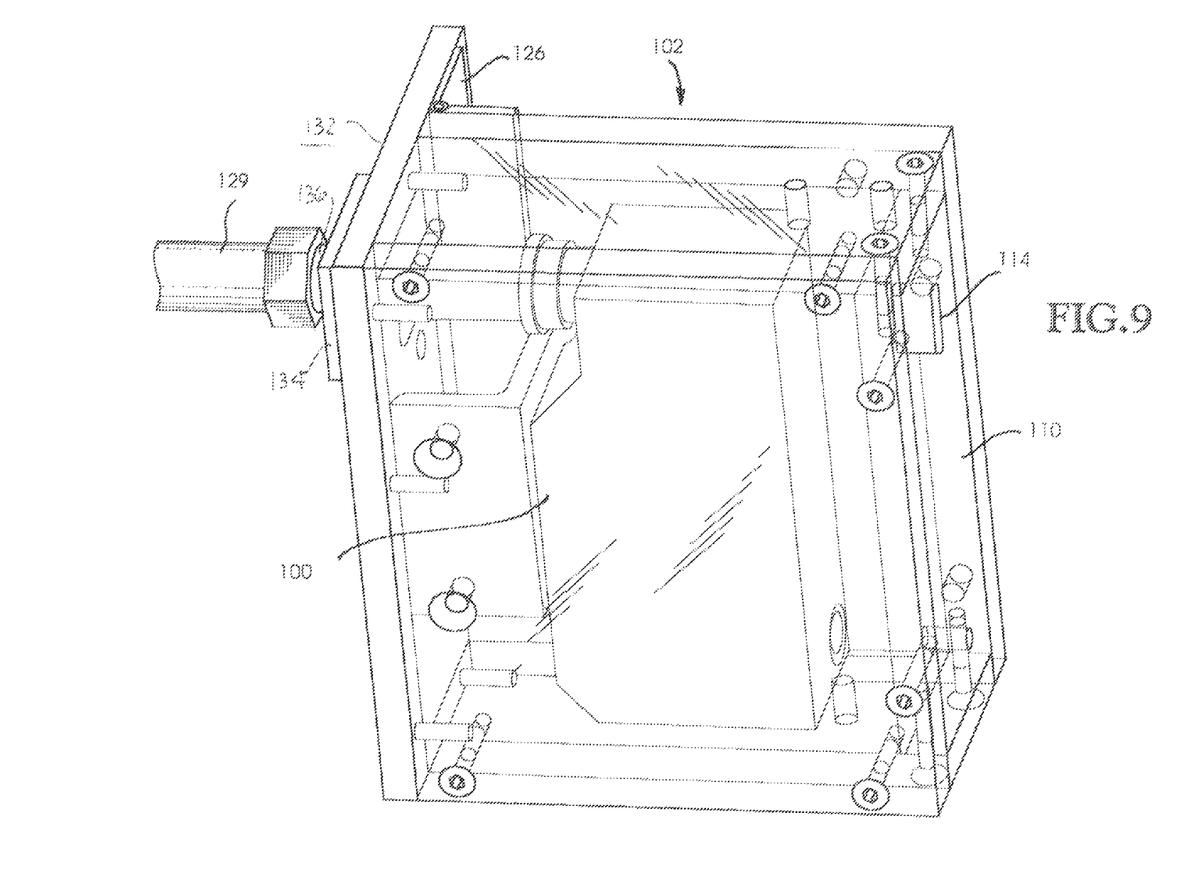
FIG. 9 is a perspective view of the enclosure assembly of FIG. 7, from the bottom of the enclosure.

Referring to FIGS. 7 and 9, the flexible power/communications cable 129 for the laser scanner 100 extends through an opening 130 in the rear plate 112. Positioned against the rear surface 132 of rear plate 112 is a connector plate 134 which also includes an opening which is threaded to receive a threaded connector member portion 136 of the power/communications cable. The connector member portion 136, when threaded into the connector plate 134, creates a water-tight connection between the power/communications cable and the enclosure. The end of the cable connected in conventional fashion to the input connector 138 of the laser scanner 100.

Figure 8:
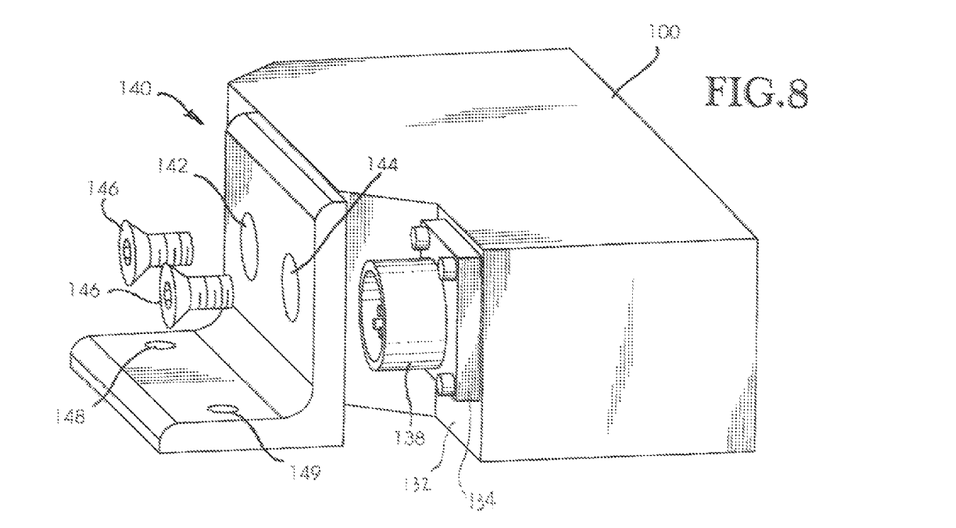
FIG. 8 is a perspective view of a support member used in the enclosure member of FIG. 7, with a laser scanner.

The laser scanner 100 is supported within the enclosure assembly by a 90° angled member 140, as shown in FIG. 8. Angled member 140, which is made from aluminum, has openings 142 and 144 in one portion thereof, cap screws 146-146 attaching the angled member 140 to the rear of the laser scanner 100. The angled member 140 also includes two threaded openings 148, 149 in another portion thereof, and two cap screws (not shown) connect the angled member to the bottom plate 106 of the enclosure assembly. This arrangement is such that the laser scanner is supported off of the lower surface of the enclosure assembly. This arrangement also has the advantage of permitting the laser scanner to be readily removed from the enclosure assembly by simply lifting the lid 106, unthreading the connector member 136 and lifting out the laser scanner. The power conductor 129 has some clack in it, permitting removal of the laser scanner. The laser scanner can then be conveniently inspected, repaired or replaced.

Figure 10:
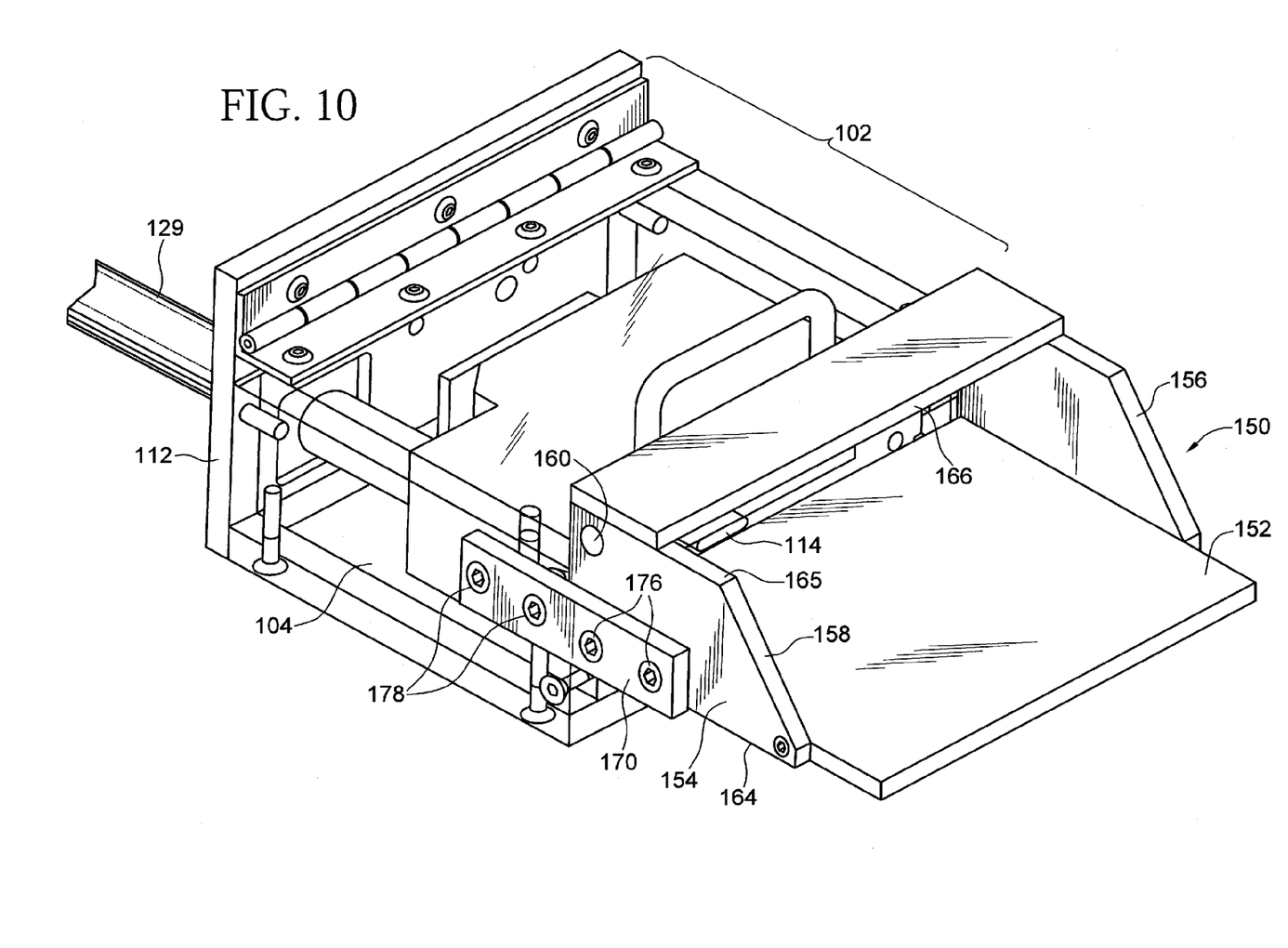
FIG. 10 is a perspective view of the enclosure assembly of FIG. 7 with an extending front assembly portion attached thereto.

FIG. 10 is a perspective view of the enclosure 102 of FIGS. 7-9, with a front assembly 150 connected to and extending from the front end of the enclosure 102. The front assembly 150 includes a first assembly plate 152, which in the embodiment shown is approximately square, 6 inches wide by 6 inches front to back. The front end assembly 150 also includes two side plates 154 and 156. Each side plate is 2.2 inches high and has an angled front edge 158, such that the edge 164 of each side plate is 4.5 inches long, while the edge 165 is 3 inches long.

In the vicinity of a rear corner of each side plate is an opening 160. The side plates are secured to the first assembly plate be screws. Attached by screws to the lower edges of the side plates 154 and 156, adjacent the front plate of the enclosure, is a second assembly plate 166, which is approximately 6.75 inches long by 1.5 inches wide.

Secured to side pates 154 and 156 are two connector plates 170 and 172, which are 1 inch wide by 4 inches long. Connector plates 170 and 172 have four openings therealong. Two cap screws 176-176 connect each connector plate to its corresponding side plate, while two cap screws 178-178 connect each connector plate to the enclosure assembly. This provides a secure, stable connection between the front end assembly and the enclosure for the laser scanner.

An air knife assembly 186 is mounted to second assembly plate 166, such that it is partially enclosed by first assembly plate 152 and side plates 154 and 156 of the front end assembly. Air knife assembly 186 is commercially available: one example is the Super Air Knife from Exair. An air knife is a device which receives compressed air from a source thereof and delivers a uniform curtain of air along the entire length of the air knife. A compressed air line extends through opening 160 in the side of the air knife. The slotted orifice or nozzle 187 in a typical product is approximately 0.002 inches. An air knife is available in various sizes, but in the embodiment shown is approximately 6 inches long so as to fit readily in the front assembly. The air knife assembly 186 is positioned so that in operation the laser beam 190 (FIG. 12) from the laser scanner is directed outwardly from enclosure 100 through opening 114 in the front plate, and then between the top plate 152 and the air knife assembly 186 of the front end assembly to the board being measured or the saw blade being monitored.

Figure 11:
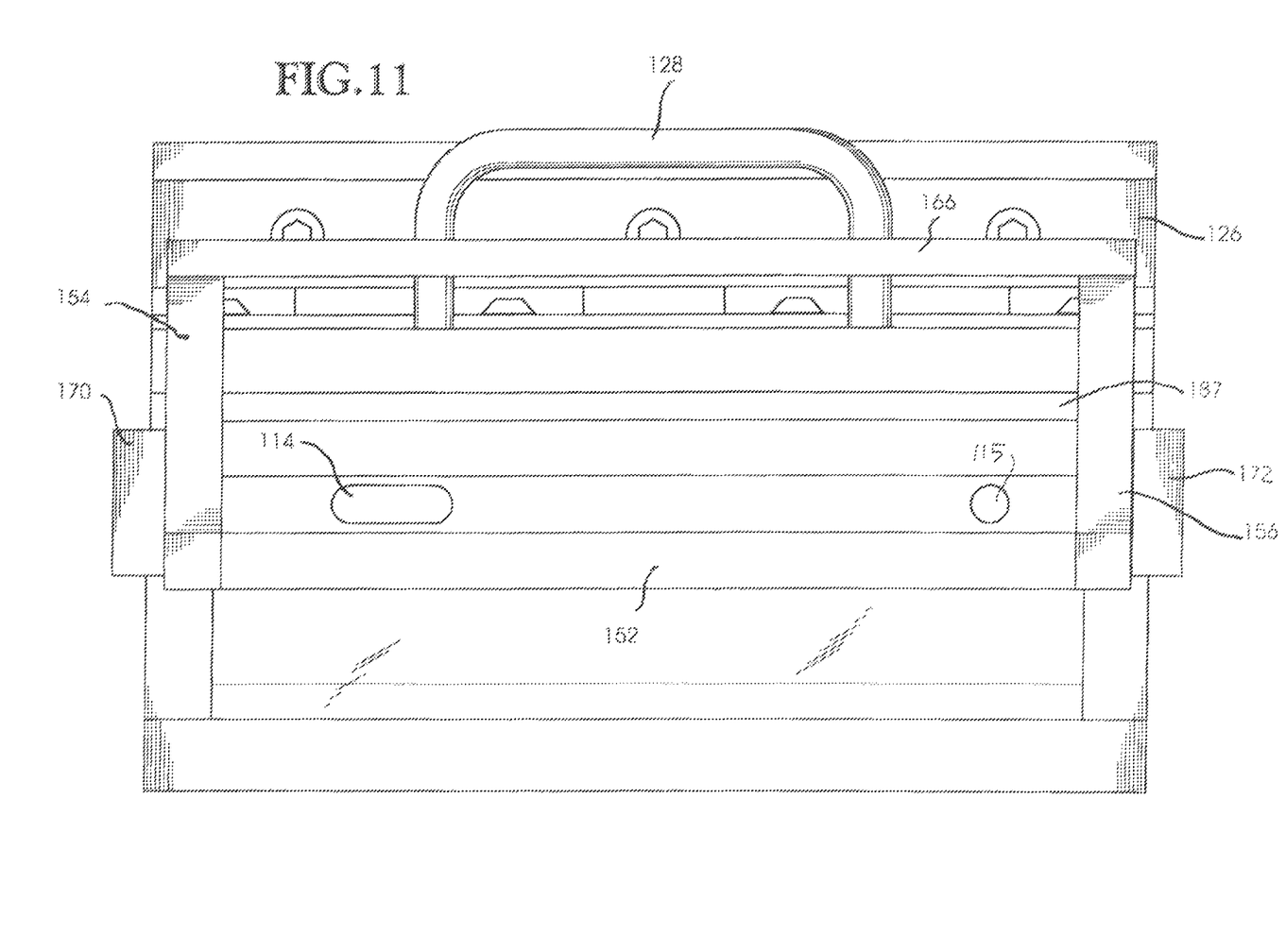
FIG. 11 is a front view of the enclosure assembly with the front assembly portion of FIG. 10.
Figure 12:
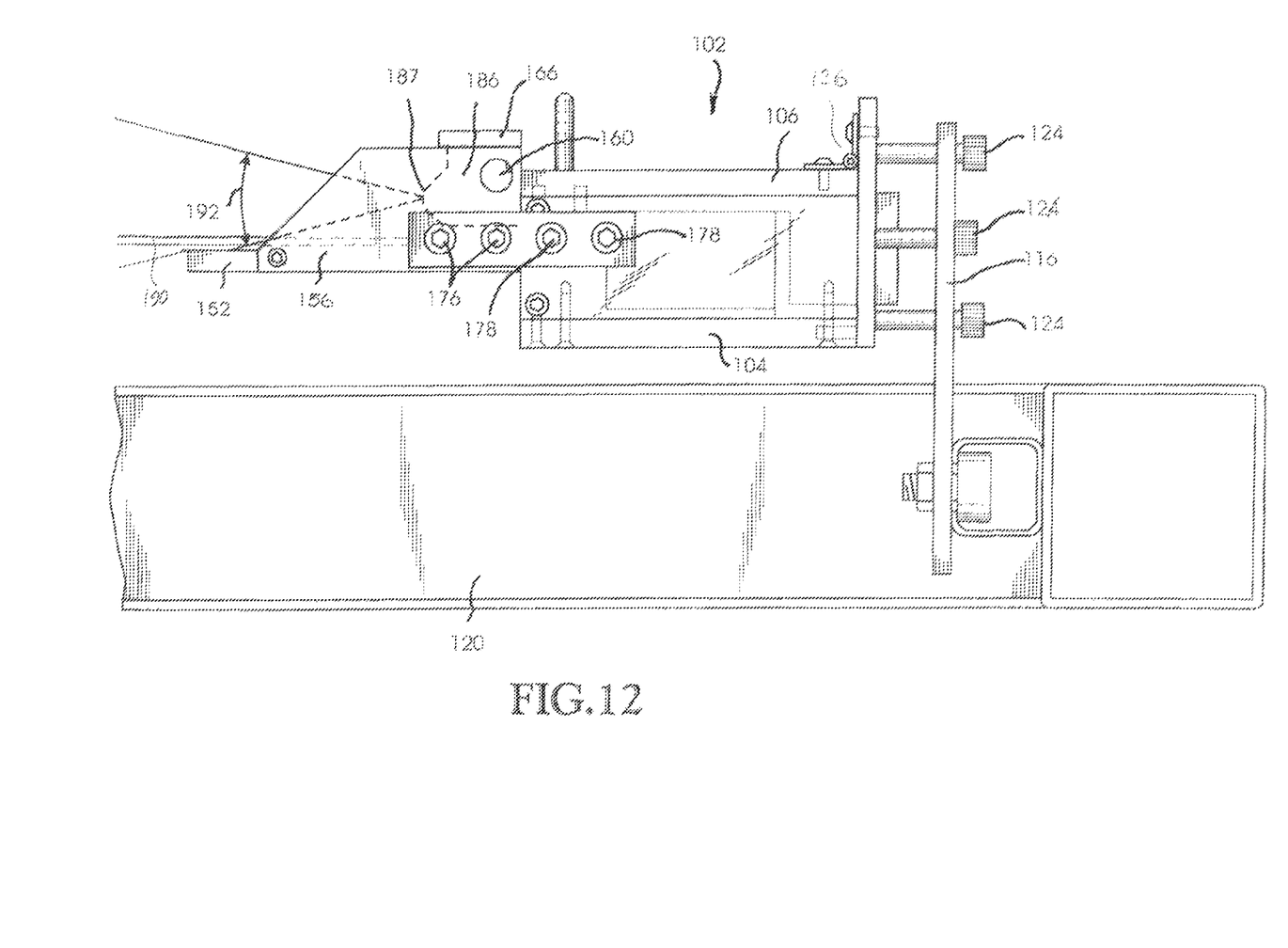
FIG. 12 is a side elevational view of the structure of FIGS. 10-11 with an air knife member and an air curtain discharge therefrom.

FIG. 12 shows the operation of the structure of FIGS. 10 and 11. As indicated above, the laser beam 190 from the laser scanner 100 is directed through opening 115 in the front plate of the enclosure 100 and then between top plate 152 and the air knife assembly 186 in the front assembly 154. The air from the air knife moves outward from the longitudinal slotted orifice/nozzle, providing a curtain of air over an included angle 192, which can vary depending upon the configuration of the air knife, but for example could be between 20° and 30°. The air flow from the slotted orifice created a uniform sheet of air along the entire length of the air knife the pulls in, i.e. entrains, surround air into the primary air stream. The air flow is directed to impact the top plate 152 near the front edge thereof, as well as the side plates 154 and 156 in the vicinity of the front edges thereof.

The curtain of air provided protection against dust and debris in the sawmill environment from obscuring the laser beam action and keeping the laser scanner camera window clean. As indicated above, the system of FIGS. 7-12 is particularly useful for monitoring saw deflection. The environment for saw blade monitoring is sever. Wood chips, sawdust, water and other debris are flying around: in addition, the laser scanner must be protected from saws that break or explode. The configuration and arrangement of the front assembly and the air knife helps to maintain a clear path for the laser beam in the challenging environment of a sawmill. Most importantly, however, the air from the air knife prevents debris buildup on the laser. If the laser gets too much debris on it, measurements will stop. In the saw blade deflection monitoring system, it is difficult to otherwise clean the laser without waiting for the end of a sawmill shift. The saws must be turned off, the machine locked out and then the box lid opened to clean the laser. The air knife is capable of keeping the laser clean for an 8 hour shift in very dirty operating conditions.

The construction of the enclosure for the laser scanner, including the hinged lid, however, does permit the window of the laser scanner to be readily cleaned, such as with a cotton swab, and with the mounting member for the laser scanner in the enclosure, permits the laser scanner to be conveniently removed from the enclosure for service and/or replacement. Hence, the arrangement shown and described in this embodiment has several distinct operational advantages.

Although preferred embodiments of the invention has been disclosed for purposes of illustration, it should be understood that various changes, modifications and substitutions may be incorporated in the embodiments without departing from the spirit of the invention which is defined by the claims which follow.

What is claimed is:

1. An enclosure assembly for a laser scanner used in a sawmill environment, comprising:
    an enclosure body, adapted to accommodate the mounting of a laser scanner therein for making measurements of a workpiece in the sawmill, wherein the enclosure body includes a front plate, which has an opening therein, through which a laser beam from the laser scanner is directed in operation; and
    a front end assembly connected to the enclosure body and extending from the front plate of the enclosure body, partially surrounding the laser beam provided by the laser scanner, wherein the front end assembly includes an air knife member mounted so as to produce a curtain of air in the direction of the workpiece, decreasing debris which would otherwise collect on the laser scanner wherein the front end assembly further includes a cover plate which extends outwardly beyond the air knife, and wherein the air knife is positioned within the front end assembly such that the curtain of air impacts the surface of the cover plate in the vicinity of a free end thereof.

2. The enclosure assembly of claim 1, including a movable lid portion, permitting access to the laser scanner therein.

3. The enclosure assembly of claim 1, including a mounting assembly attached to the enclosure body which permits physical adjustment of the enclosure body to achieve a desired aiming of the laser scanner relative to the workpiece.

4. The enclosure assembly of claim 2, wherein the lid portion is so configured and includes a hinge so that the entire interior of the enclosure is accessible, thereby permitting convenient removal of the laser scanner from the enclosure body without disassembling the enclosure body and access to the laser scanner for cleaning thereof.

5. The enclosure assembly of claim 1, including a 90° support member which is secured to the enclosure body and the laser scanner for mounting of the laser scanner within the enclosure body.

6. The enclosure assembly of claim 5, wherein the 90° support member is attached to the enclosure body such that the laser scanner is supported away from interior surfaces of the enclosure body.

7. The enclosure assembly of claim 1, including a watertight connection between the enclosure body and a power/communications cable connectable to the laser scanner within the enclosure body.

8. The enclosure assembly of claim 1, including two opposing connector plates which removably connect the front end assembly to the enclosure body.

9. The enclosure assembly of claim 1, wherein the enclosure body and the front end assembly are made of a polycarbonate plastic.

* * * * *